United States Patent
Kessler et al.

(10) Patent No.: US 6,621,047 B2
(45) Date of Patent: Sep. 16, 2003

(54) METHOD AND SENSOR DEVICE FOR MONITORING A LASER MACHINING OPERATION TO BE PERFORMED ON A WORK PIECE AS WELL AS LASER MACHINING HEAD WITH A SENSOR DEVICE OF THE KIND

(75) Inventors: Berthold Kessler, Greifenstein-Arbonn (DE); Bert Schürmann, Gaggenau (DE)

(73) Assignee: Precitec KG, Gaggenau-Bad Rotenfels (DE)

(*) Notice: Subject to any disclaimer, the term of this patent is extended or adjusted under 35 U.S.C. 154(b) by 0 days.

(21) Appl. No.: 10/128,484

(22) Filed: Apr. 24, 2002

(65) Prior Publication Data

US 2002/0158053 A1 Oct. 31, 2002

(30) Foreign Application Priority Data

Apr. 25, 2001 (DE) ............................. 101 20 251

(51) Int. Cl.$^7$ ................................................ B23K 26/03
(52) U.S. Cl. .................................................. 219/121.83
(58) Field of Search ........................ 219/121.83, 121.67, 219/121.68, 121.69, 121.7, 121.71, 121.72, 121.75, 121.76, 121.77; 356/237.2, 237.3, 237.4, 237.5, 237.6

(56) References Cited

U.S. PATENT DOCUMENTS 5,272,312 A * 12/1993 Jurca ...................... 219/121.83
5,578,229 A * 11/1996 Barnekov et al. ........ 219/121.72
6,035,526 A *  3/2000 Saruta et al. .................. 29/846
6,118,527 A *  9/2000 Jurca ........................ 356/239.1

FOREIGN PATENT DOCUMENTS

| DE | 196 30 437 A1 | 1/1998 |
| DE | 100 13 892 A1 | 12/2000 |
| WO | 90/10520 A1 | 9/1990 |

OTHER PUBLICATIONS

Schlichtermann et al., Monitoring Laser Welding Processes On-line with LWM 900, 5 pages. No date available.

* cited by examiner

Primary Examiner—Tom Dunn
Assistant Examiner—Jonathan Johnson
(74) Attorney, Agent, or Firm—Birch, Stewart, Kolasch & Birch LLP

(57) ABSTRACT

The invention concerns a method which can be carried out with a sensor device, for monitoring a laser machining operation to be performed on a work piece (12), in which for quality assurance with a local-resolution receiver assembly (10, 11, 14) a given field of observation (13) is selected in the region of the interaction zone between laser beam (25) and work piece (12), in which radiation coming from the selected field of observation (13) is detected with a radiation-sensitive receiver (10) which delivers an electrical signal corresponding to the detected radiation, in which the electrical signal is filtered in a signal processing circuit (16) in order to detect rapid and/or short, fault-related changes in intensity of the detected radiation, and in which the filtered electrical signal for the detection of faults during the laser machining operation.

19 Claims, 1 Drawing Sheet

Figure 1:
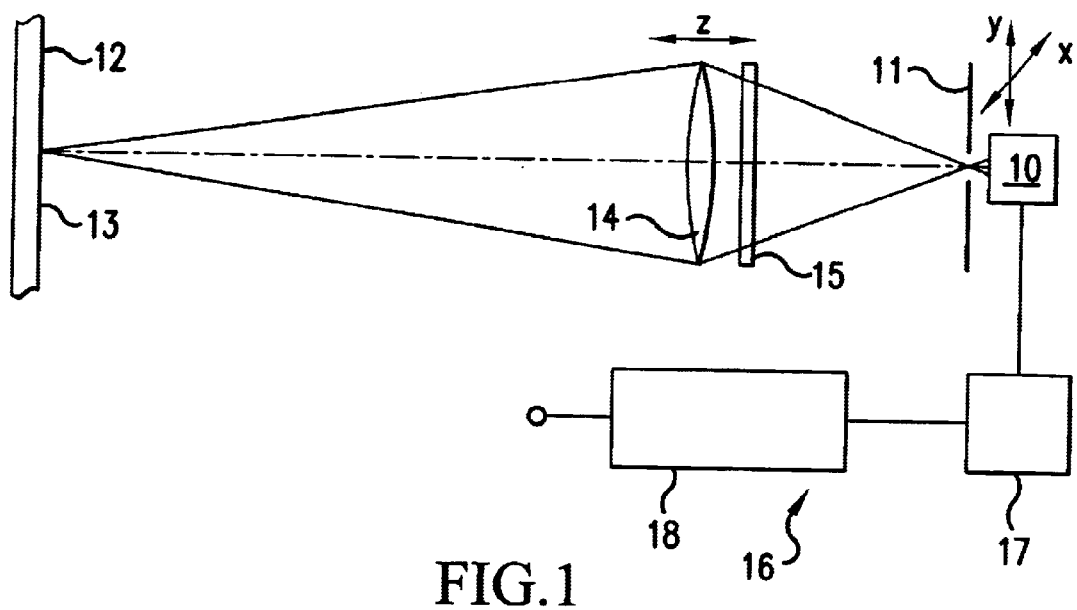

METHOD AND SENSOR DEVICE FOR MONITORING A LASER MACHINING OPERATION TO BE PERFORMED ON A WORK PIECE AS WELL AS LASER MACHINING HEAD WITH A SENSOR DEVICE OF THE KIND

The invention concerns a method for monitoring a laser machining operation to be performed on a work piece as well as a sensor device for carrying out a method of this kind and a laser machining head with a sensor device of this kind.

From WO 90/10520 is already known a method for quality assurance in laser beam welding and cutting, in which the ultraviolet light produced from a plasma cloud during material machining, for checking laser beam coupling and other process parameters, is detected with an UV-sensitive photodiode which is arranged in a detector head. In addition or instead of the UV-sensitive photodiode an IR-sensitive photodiode can be provided in the detector head, wherein the IR-sensitive photodiode can be shielded by a slidable stop from the welding hearth of laser machining.

In order to be able to detect the radiation from the plasma cloud, the plasma cloud which arises in the region or in the environment of the interaction zone between laser beam and work piece, that is, e.g. in the region of the welding hearth, is projected onto the photodiode or diodes. The stop for interrupting direct visual contact between photodiode and welding hearth is in this case arranged in a region between projection lens and photodiode as a set screw which is slidable perpendicularly to the optical axis of the projection lens.

Further, it is known from the article by L. Schlichtermann et al., "Monitoring laser welding processes on-line with LWM 900", that the radiation arising in the region or in the environment of the interaction zone during laser machining can be monitored according to spectral region and location separately in order to infer the quality of the laser welding process from corresponding data. In this case, firstly the temperature of the weld seam is detected a few millimeters behind the welding hearth by measuring the IR radiation. To detect the size of splashes which are occasionally thrown out of the welding hearth, radiation is measured in the near infrared region. Moreover, the UV light of the plasma cloud is detected.

The individual detectors are in this case designed in such a way that the plasma cloud or the weld seam is projected onto the radiation-sensitive receivers.

The electrical signals which are delivered by the radiation-sensitive receivers and which correspond to the radiation detected at any given time are then suitably evaluated in order to be able to make statements about the quality of the individual machining operation. While larger splashes and holes arising in connection therewith in the weld seam can be detected reliably, with conventional online quality monitoring it is almost impossible to detect very small welding faults and holes, as the signal fluctuations arising due to corresponding small splashes or spittings lie within the permitted width of fluctuation of the measurement signals which may occur with perfect laser machining.

Starting from this, it is the object of the invention to provide a further method for monitoring a laser machining operation to be performed on a work piece, which makes it possible to reliably detect even small faults in laser machining, in particular small spittings/splashes or holes in the weld seam. In addition, it is the object of the invention to provide a sensor device for carrying out a method of this kind as well as a laser machining head equipped therewith.

According to the invention, it is therefore provided that a given field of observation is selected in the region of the interaction zone between laser beam and work piece, that is, on the interaction zone itself or in the environment thereof, and that a signal delivered by a radiation-sensitive receiver and corresponding to the detected radiation is subjected to filtering in order to detect smaller faults such as small spittings or splashes as well as small holes, and in order then to evaluate the filtered electrical signal for the detection of faults during the laser machining operation.

In order to be able to detect small and very small faults during the laser machining operation, a special, clearly defined field of observation is therefore fixed, and the electrical signal corresponding to the radiation coming from this field of observation is filtered so that signal fluctuations caused by smaller machining faults can be detected as well.

The selection of a given field of observation can in this case be made variously, depending on the design of the radiation-sensitive receiver. For instance, it is conceivable that a CCD image sensor is used as the radiation-sensitive receiver in order to fix the field of observation by selection of corresponding pixels of the receiver. A similar procedure could also be carried out with a row of CCD sensors.

In an advantageous embodiment of the invention, it is however provided that for the selection of a given field of observation the interaction zone is projected onto a stop arranged in front of the radiation-sensitive receiver. This not only makes it possible to clearly define a given field of observation and effectively reduce scattered light from other regions, but it is also possible, irrespective of the design of the radiation-sensitive receiver, that is, irrespective of the shape of its radiation-sensitive receiver surface, to fix a precise field of observation which can be shaped as desired and which can be e.g. punctiform or linear.

An appropriate development of the invention is distinguished by the fact that a spectral sensitivity of the radiation-sensitive receiver is fixed according to the selected field of observation.

A particularly preferred embodiment of the invention is characterised in that the electrical signal is subjected to high-pass filtering, wherein the filtered electrical signal is compared with stored values of a perfect machining operation.

By means of the high-pass filtering according to the invention, in combination with the suppression of perturbing radiation from regions other than the selected field of observation, fluctuations of the electrical output signal of the receiver which are caused by small faults in the machining operation can be detected reliably, so that quality monitoring for laser machining operations can be substantially improved.

To carry out the method according to the invention, a sensor device is provided with a local-resolution receiver assembly with which an area in the region of the interaction zone can be selected as a field of observation so that the receiver assembly delivers an electrical output signal corresponding to the detected radiation from the field of observation, and with a signal processing circuit which processes the output signal of the receiver assembly after suitable filtering in order to detect faults during the laser machining operation.

Appropriately, the signal processing circuit comprises a filter circuit for filtering the output signal of the receiver assembly and an evaluating circuit which evaluates the filtered electrical signal. The filter circuit is in this case preferably a high-pass filter.

In order to be able to carry out the monitoring according to the invention with a plurality of different laser machining operations for the most varied materials, it is provided that the evaluating circuit includes storage means for storing threshold values and/or output signal values of a perfect machining operation and a comparator circuit which compares the detected, filtered output signal with the stored values and delivers a reference signal which indicates faults during the machining process.

In a particularly appropriate embodiment of the invention it is provided that the local-resolution receiver assembly includes a projection lens with which an area in the region of the interaction zone between laser beam and work piece can be projected onto a stop in order to select a given field of observation, and a radiation-sensitive receiver which is arranged optically behind the stop in the radiation direction of the radiation to be detected and delivers an electrical output signal corresponding to the detected radiation.

In order to be able to carry out satisfactory adjustment of the monitoring beam path of the sensor device even when the sensor device is fixed relative to the interaction zone, that is, for example held fast on a laser machining head, it is provided that the optical distance between projection lens and stop is variable, wherein the stop is slidable perpendicularly to the optical axis of the projection lens in at least one direction, but preferably in two directions linearly independent of each other, in order to be able to select a given area in the region of the interaction zone between laser beam and work piece as the field of observation.

An apertured stop which fixes a central field of observation, or a stop inverse thereto for covering a central region, can be provided as the stop. Rationally, the shape of the stop, e.g. point, circle, quadrangle, line or the like, is selected according to the spectral sensitivity of the receiver.

Thus for example it is possible that, when the radiation-sensitive receiver is a temperature sensor, in particular a temperature sensor sensitive to infrared radiation, the receiver is combined either with an apertured stop or with a stop inverse thereto. In the former case, the receiver used as a temperature sensor is oriented in such a way that the apertured stop fixes an observation spot following welding. Together with an inverse stop which masks the so-called keyhole region, the temperature sensor can be used to detect infrared radiation from the whole of the environment of the keyhole or welding hearth.

In another embodiment of the invention it is provided that the radiation-sensitive receiver is a receiver sensitive to plasma radiation. A receiver of this kind is used with an apertured stop which fixes a region of the plasma cloud as the field of observation in order to greatly improve the signal-to-noise ratio on account of normally great fluctuations in the plasma cloud. If a receiver which is sensitive to the machining laser radiation is used to detect the back reflex, that is, the machining laser radiation reflected back by the machining region, due to the combination of a receiver of this kind with an apertured stop the scattered laser radiation at the plasma cloud can be largely suppressed.

To simplify selection and adjustment of a field of observation, in an appropriate embodiment of the invention it is provided that a device is provided for observing the selection of a field of observation in the region of the interaction zone between laser beam and work piece, which comprises an observation lens whose observation beam path can be coupled via a beam splitter mirror to the monitoring beam path, wherein the device for observing the selection of a field of observation is a camera, preferably a video camera.

A further improvement and simplification of adjustment of the sensor device according to the invention can be achieved if there is provided a light source which illuminates the stop from the receiver side during adjustment of the local-resolution receiver assembly, so that an image of the stop can be observed on the work piece for selection of a field of observation in the region of the interaction zone between laser beam and work piece, wherein for adjustment of the local-resolution receiver assembly the light source can be exchanged for the radiation-sensitive receiver and moved with the stop.

A laser light source or a cold light source with fibre bundle can be provided as the light source here. A particular advantage of the cold light source lies in that, for fixing the field of observation, the stop can also be adjusted on components which are very hard to see, using an observation camera.

If a laser machining head is equipped with a sensor device according to the invention, it is particularly advantageous if the sensor device is arranged in such a way that the monitoring beam path and if occasion arises the observation beam path is coupled via a beam splitter mirror to the laser machining beam path in such a way that the focussing lens for a working laser beam together with the projection lens of the receiver assembly projects the selected field of observation onto the stop.

Figure 2:
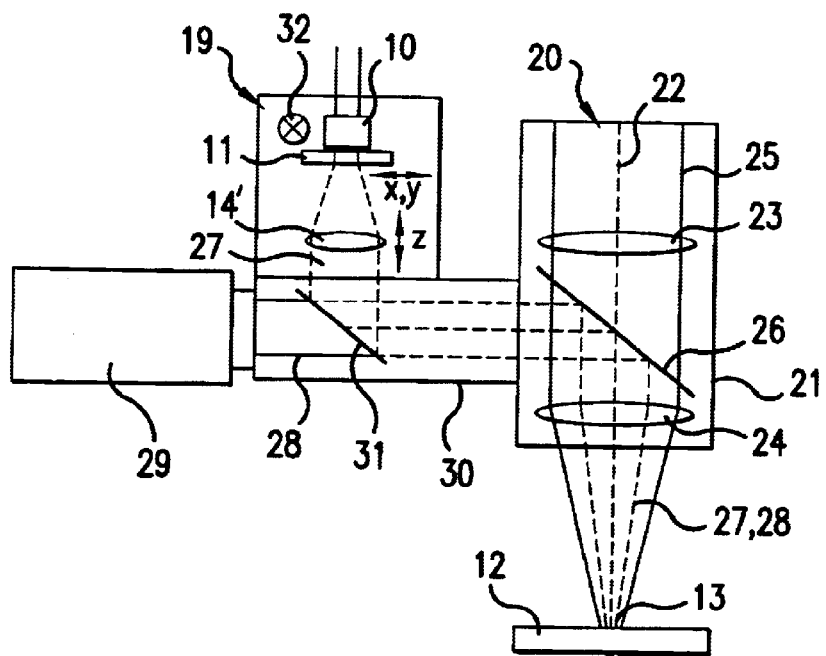

The invention is described in more detail below as an example with the aid of the drawings. They show:

FIG. 1 a simplified schematic view of the observation beam path of a sensor device suitable for carrying out the method according to the invention in combination with a simplified block diagram of a signal processing circuit, and FIG. 2 a simplified schematic view of a laser machining head with sensor device arranged thereon and observation camera for adjusting the sensor device.

In the two figures of the drawings, components corresponding to each other are given the same reference numbers.

As shown in FIG. 1, the sensor device for carrying out the method according to the invention comprises a radiation-sensitive receiver 10 in front of which a stop 11 is mounted so as to be slidable in X and Y directions. Instead of the stop 11 shown as an apertured stop, a stop inverse thereto may be provided, which covers the central region of the radiation-sensitive receiver 10. The shape of the stop does not have to be a circle, but can have any shape in order to fix a field of observation 13 on a work piece 12. For this purpose the stop 11 is projected by a projection lens 14 onto the work piece surface 12, or the work piece surface 12 is projected onto the stop 11, which is equivalent thereto. The projection lens 14, which is shown as a thin single lens in FIG. 1, can also be composed of several lenses. Further, it is conceivable to use a projection mirror as the projection lens 14, with the result in particular that losses of intensity in case of observations in the ultraviolet spectral region are avoidable.

To carry out sharply defined projection, the projection lens 14 is arranged in the traditional manner so as to be slidable in the Z direction, that is, in the direction of its optical axis.

Depending which spectral region of the radiation emanating from the field of observation 13 is to be detected, a corresponding filter 15 can be arranged at a suitable location in the observation beam path. For continuous monitoring of a laser machining operation, the radiation-sensitive receiver 10 delivers an electrical signal which corresponds to the received radiation intensity, to a signal processing circuit 16 which includes a filter circuit 17 and an evaluation circuit 18. The filter circuit can in this case be any filter assembly which extracts small, short and/or rapid signals from the noise. Preferably, the filter circuit is formed by a high-pass filter 17. But it is also conceivable to use a band-pass filter.

To evaluate the high-pass-filtered electrical signal, the evaluating circuit 18 includes, in a manner not shown in more detail, storage means for storing threshold values and/or values which have been determined by means of a perfect machining operation, and a comparator circuit which compares the detected filtered output signal with the stored values and delivers a reference signal from which faults during the machining process can be deduced. The filtered output signal of the radiation-sensitive receiver 10 can also be stored in storage means, also not shown, of the evaluating circuit and/or delivered for recording, in order to record the machining cycle and to document the quality of the respective machining result.

Further, an indicating, warning and/or alarm signal can also be delivered if the number of faults detected or the size thereof exceed certain limit values. Such output signals of the evaluating circuit 18 can be further processed in a suitable manner in a machine control system, not shown in more detail.

FIG. 2 shows the arrangement of a local-resolution receiver assembly 19 on a laser machining head 20. The laser machining head 20 includes a housing 21 through which a laser machining beam path 22 is passed with a collimator 23 and a focussing lens 24 for the working laser beam 25. In front of the focussing lens 24 in the direction of the working laser beam is arranged a beam splitter mirror 26 which serves to couple a monitoring beam path 27 and an observation beam path 28 to the last section of the laser machining beam path 22. The receiver assembly 19 and an observation camera 29, which is for example a video camera, are held by means of a connecting housing 30 on the housing 21 of the laser machining head 20. In the connecting housing 30 is mounted a further beam splitter mirror 31 for coupling the observation beam path 28 to the monitoring beam path 27.

To adjust the sensor device according to the invention for carrying out the monitoring method according to the invention, first the laser machining head is positioned relative to the work piece 12 as required for the intended laser machining. Then in the receiver assembly 19 the radiation-sensitive receiver 10 is exchanged for a suitable light source 32, e.g. a laser light source or a cold light source with fibre bundle, to illuminate the stop 11 from behind. The projection lens 14' projects the stop 11 via the beam splitter mirror 31 and the beam splitter mirror 26 together with the focussing lens 24 for the working laser beam 25 onto the surface of the work piece 12. The position and definition of the image of the stop 11 on the work piece surface can be observed with the camera 29, which observes the work piece surface through the beam splitter mirror 31 via the beam splitter mirror 26 in the laser machining head 20 and the focussing lens 24.

By sliding the stop 11 in the X and Y directions, that is, perpendicularly to the optical axis of the observation beam path 27, a field of observation 13 can be fixed on the work piece surface relative to the interaction zone between laser beam and work piece. By sliding the projection lens 14' in the Z direction, that is, in the direction of the optical axis, the stop can be sharply projected onto the work piece surface without the individual parameters of the focussing lens 24 for the working laser beam 25 having to be known.

After the image of the stop 11 has been oriented on the work piece surface and brought into focus in the manner described, a given field of observation has been selected relative to the interaction zone. The position of the field of observation, which is projected onto the stop 11 inversely by the focussing lens 24 via the beam splitter mirrors 26, 31 together with the projection lens 14', is in this case fixed according to the desired monitoring.

Next the light source 32 is again exchanged for the radiation-sensitive receiver 10. The sensor device is now ready for monitoring a laser machining operation.

During the actual monitoring operation, the radiation coming from the selected field of observation 13 is detected by the radiation-sensitive receiver 10, which delivers a corresponding electrical output signal to the high-pass filter 17. The output signal of the high-pass filter 17 is then processed accordingly by the evaluating circuit 18 to detect faults in the laser machining operation. In the process, the filtered output signal of the radiation-sensitive receiver is compared with stored values. At its simplest, a threshold value can be stored for this purpose, on exceeding which a fault in the laser machining process is deduced. But it is also possible, as already mentioned, the compare the filtered output signal with corresponding stored values which have been determined by means of a perfect laser machining operation, in order then to deduce machining errors if the deviations between the current and stored values are greater than a predetermined tolerance threshold.

Instead of the single radiation-sensitive receiver 10 which is used by means of a stop 11 for observation of a given field of observation, a row of CCD image sensors with or without stop can also be used. Further, it is also possible to use a two-dimensional CCD image sensor, in which case evaluation of the receiver signals can be carried out with a suitable image processing circuit.

On the other hand, when using a two-dimensional CCD image sensor it is also possible to fix a given field of observation in the region of the interaction zone, that is, on the zone itself or in the environment thereof, on the work piece by selecting corresponding image points of the CCD image sensor and evaluating only the output signals of these image points, which if occasion arises can be spatially integrated.

What is claimed is:

1. Sensor device for monitoring a laser machining operation to be performed on a work piece (12) comprising:
    a local-resolution receiver assembly (10, 11, 14) with which an area in the region of the interaction zone can be selected as a field of observation (13) so that the receiver assembly delivers an electrical output signal corresponding to the detected radiation from the field of observation (13), and
    a signal processing circuit (16) which processes the output signal of the receiver assembly after suitable filtering in order to detect faults during the laser machining operation.

2. Sensor device according to claim 1, characterised in that the signal processing circuit (16) comprises a filter circuit (17) for filtering the output signal of the receiver assembly and an evaluating circuit (18) which evaluates the filtered electrical signal.

3. Sensor device according to claim 2, characterised in that the filter circuit is a high-pass filter (17).

4. Sensor device according to claim 2 or 3, characterised in that the evaluating circuit (18) includes storage means for storing threshold values and/or output signal values of a perfect machining operation and a comparator circuit which compares the detected, filtered output signal with the stored values and delivers a reference signal which indicates faults during the machining process.

5. Sensor device according to claim 1, characterized in that the local-resolution receiver assembly includes:
    a projection lens (14) with which an area in the region of the interaction zone between laser beam and work piece

(12) can be projected onto a stop (11) in order to select a given filed of observation (13), and a radiation-sensitive receiver (10) which is arranged optically behind the stop (11) in the radiation direction of the radiation to be detected and delivers an electrical output signal corresponding to the detected radiation.

6. Sensor device according to claim 5, characterised in that the optical distance between projection lens (14) and stop (11) is variable.

7. Sensor device according to claim 5 or 6, characterised in that the stop (11) is slidable perpendicularly to the optical axis of the projection lens (14) in at least one direction, but preferably in two directions linearly independent of each other, in order to be able to select a given area in the region of the interaction zone between laser beam (25) and work piece (12) as the field of observation (13).

8. Sensor device according to claim 5 characterized in that the stop (11) is an apertured stop.

9. Sensor device according to claim 5, characterized in that the stop (11) is an inverse stop for covering a central region.

10. Sensor device according to claim 5, characterized in that the radiation-sensitive receiver (10) is a temperature sensor, in particular a temperature sensor sensitive to infrared radiation.

11. Sensor device according to claim 5, characterized in that the radiation-sensitive receiver (10) is a receiver sensitive to plasma radiation.

12. Sensor device according to claim 5, characterized in that the radiation-sensitive receiver (10) is a receiver (10) which is sensitive to the machining laser radiation.

13. Sensor device according to claim 5, characterized in that a device (29) is provided for observing the selection of a field of observation (13) in the region of the interaction zone between laser beam (25) and work piece (12), which comprises an observation lens whose observation beam path can be coupled via a beam splitter mirror to the monitoring beam path.

14. Sensor device according to claim 13, characterised in that the device for observing the selection of a field of observation is a camera (29), preferably a video camera.

15. Sensor device according to claim 5, characterized in that there is provided a light source (32) which illuminates the stop (11) from the receiver side during adjustment of the local-resolution receiver assembly, so that an image of the stop (11) can be observed on the work piece (12) for selection of a field of observation (13) in the region of the interaction zone between laser beam (25) and work-piece (12).

16. Sensor device according to claim 15, characterised in that for adjustment of the local-resolution receiver assembly the light source (32) can be exchanged for the radiation-sensitive receiver (10) and moved with the stop (11).

17. Sensor device according to claim 15 or 16, characterised in that the light source (32) is a laser light source.

18. Sensor device according to claim 15 or 16, characterised in that the light source (32) is a cold light source with fibre bundle.

19. Laser machining head with a sensor device according to claim 5, characterized in that the monitoring beam path (27) and if occasion arises the observation beam path (28) is coupled via a beam splitter mirror (26) to the laser machining beam path (22) in such a way that the focusing lens (24) for a working a laser beam (25) together with the projection lens (14') of the receiver assembly projects the selected field of observation (13) onto the stop (11).

* * * * *